(12) United States Patent
Zou et al.

(10) Patent No.: US 10,231,168 B2
(45) Date of Patent: Mar. 12, 2019

(54) METHOD AND APPARATUS FOR IDLE USER EQUIPMENT REDISTRIBUTION IN A HETNET FOR LOAD BALANCE

(71) Applicant: Alcatel Lucent, Paris (FR)

(72) Inventors: Jialin Zou, Randolph, NJ (US); Sudeep Palat, Swindon (GB); Seau Sian Lim, Swindon (GB)

(73) Assignee: ALCATEL LUCENT, Paris (FR)

( * ) Notice: Subject to any disclaimer, the term of this patent is extended or adjusted under 35 U.S.C. 154(b) by 0 days.

(21) Appl. No.: 14/177,968

(22) Filed: Feb. 11, 2014

(65) Prior Publication Data

US 2015/0230141 A1 Aug. 13, 2015

(51) Int. Cl.
*H04W 36/00* (2009.01)
*H04W 48/06* (2009.01)
*H04W 72/02* (2009.01)
*H04W 48/18* (2009.01)

(52) U.S. Cl.
CPC ............ *H04W 48/06* (2013.01); *H04W 48/18* (2013.01); *H04W 72/02* (2013.01)

(58) Field of Classification Search
CPC .............................. H04W 36/30; H04W 88/06
See application file for complete search history.

(56) References Cited

U.S. PATENT DOCUMENTS

2008/0189360 A1    8/2008   Kiley et al.
2011/0141908 A1*   6/2011   Ishida .................. H04W 48/02
                                                            370/241
2014/0161103 A1*   6/2014   Sirotkin et al. ............... 370/332
2014/0370890 A1*   12/2014  Huang .................. H04W 48/02
                                                            455/434
2015/0063297 A1*   3/2015   Yu ........................ H04W 48/18
                                                            370/331

FOREIGN PATENT DOCUMENTS

| CN | 102939781 A | 2/2013 |
| CN | 103220749 A | 7/2013 |
| EP | 1947889 A2 | 7/2008 |
| EP | 2378810 A2 | 10/2011 |
| WO | WO-2009/057960 A2 | 5/2009 |
| WO | WO-2013-149568 A1 | 10/2013 |
| WO | WO-2014/014859 A1 | 1/2014 |

OTHER PUBLICATIONS

3GPP TS 36.304 v.9.0.0 "Evolved Universal Terrestrial Radio Acces (E-UTRA); User Equipment (UE) procedures in idle mode" (2009).
3GPP TS 36.331 v.9.0.0 "Evolved Universal Terrestrial Radio Access (E-UTRA) Radio Resource Control (RRC); Protocol specification" (2009).
Chinese Office Action dated Nov. 12, 2018 in Chinese Application No. 201580007944.4.

* cited by examiner

*Primary Examiner* — Justin Y Lee
(74) *Attorney, Agent, or Firm* — Harness, Dickey & Pierce, PLC

(57) ABSTRACT

In one example embodiment, a user equipment includes a processor. The processor is configured to receive a message, determine whether to perform a carrier frequency selection process based on the received message, the carrier frequency selection process being performed for determining a carrier frequency for the user equipment to operate on, and determine the carrier frequency by performing the carrier frequency selection process if the processor determines to perform the carrier frequency selection process.

20 Claims, 9 Drawing Sheets

METHOD AND APPARATUS FOR IDLE USER EQUIPMENT REDISTRIBUTION IN A HETNET FOR LOAD BALANCE

BACKGROUND OF THE INVENTION

Field

Embodiments relate to associating user equipment (UE) with multiple carriers in a Heterogeneous wireless network (HetNet).

Related Art

Load balance among the multiple carriers in a wireless network is typically a system design goal. Notably, when non-contiguous spectrum with multi-carriers of different bandwidth is involved, different geographical areas may be covered by different numbers of carriers of different bands. The idle redistribution in a system with only macro cell base stations has been studied for years and is well understood. However, Heterogeneous wireless networks (HetNets) introduce many new scenarios, which do not exist in a macro only system and require special treatment. Load balancing may refer to redistribution of idle UEs among available carrier frequencies to avoid overloading of certain carrier frequencies and/or to more efficiently use network resources.

HetNets are deployments of cells with differing coverage radii within a single geographic area. FIG. 1 illustrates an example configuration of a HetNet. As shown, macro cell layer(s) (MC1 and MC2) and small cell layer(s) (SC1-SC6) may have the same or different frequency carriers. There may be multiple small cells of the same or different carriers (carrier frequencies) overlaid with macro cell(s) of the same or different carriers. Overlaid cells may refer to overlap of cells' carrier frequencies. In a conventional macro only system, different carriers may be overlaid with each other such as frequency F1 of MC1 and frequency F2 of MC2, shown in FIG. 1. However, in HetNets, small cell coverage may be only partially overlaid with the macro cell coverage. Different small cells of different carriers may or may not be overlaid with each other (e.g., SC3/SC6 v. SC4/SC5, shown in FIG. 1). Different small cells of the same or different carriers may have different load condition/s. The operator/s of HetNets may also control the load of different carriers/cells based on the Grade of Service (GoS) and Quality of Service (QoS) requirements. As a result, the operator/s may have different load balance requirement/s relative to the macro cell carriers and other small cell carriers. Using the basic idle redistribution method for macro only systems in HetNets may result in a number of problems as described in the following.

First, there may be Ping-Pong problems if there are multiple small cells of the same carrier overlaid with a different macro carrier and the load balance needs of the small cells cannot be differentiated. For example, in FIG. 1, SC1, SC2 and SC4 have the same carrier frequency, F3. Assume SC2 is overloaded, SC1 and SC4 are under loaded (e.g., when SC2 may be a hot spot of activity and SC1 and SC4 are not). The macro layer, e.g. (F1, MC1) may treat SC1, SC2 and SC4 the same as they (SC1, SC2 and SC4) have the same carrier frequency, F3. Therefore, the instruction from the MC1 may only be offloading from F1 to F3 as the conventional macro to small layer offload operation. As a result, idle UEs offloaded from overloaded (F3, SC2) to (F1, MC1) will be ping-ponging between SC2 and MC1 before these idle UEs move out the SC2 coverage.

Second, with a basic probability based solution, the situation of not-enough offload to small cells may occur if multiple small cells of different carriers are overlaid with the macro layer but are not overlaid with each other. For example with respect to FIG. 1, the macro only redistribution method assumes the carriers F1, F2, F3 and F4 are fully overlapped. Therefore, even when the operator intends to instruct 100% of UEs to be redistributed from the macro cell carrier frequencies F1 and F2 to F3 and F4 by setting 50% to F3 and 50% to F4 with 0% to F1 and 0% to F2, at the (F3, SC2) coverage, only 50% of idle UEs reselect to F3 with the 50% to be redistributed to F4, staying with the macro layer (e.g., MC1). This may be due to the fact that at the coverage of (F3, SC2) there is no F4. Therefore, 50% of UEs which have designated F4 with the highest priority to switch to, stay with current serving carrier which is still has higher priority than other carriers until these UEs move into F4 coverage area. Similarly, only 50% of the UEs go to F4 under the SC4 coverage.

Third, when small cells of different frequencies are overlapped, idle UEs should be properly distributed across the overlaid small cells while at the same time preventing Ping-Pongs between the small layers and macro layer as well as among the small cells. For example in FIG. 1, if both SC4 and SC5 are overloaded, the situations of UEs offloading from SC4 to the macro layer and moving to SC5 and vice versa, should preferably be avoided.

Overall, in HetNets additional efforts should be made to address one or more of the new issues introduced by new HetNet scenarios. In HetNets, normally an operator will configure the system to make UEs more likely or have high priority to reselect to the overlaid small cells such that the macro cell layer can offload traffic to the small cell layer.

SUMMARY OF THE INVENTION

In one example embodiment, a user equipment includes a processor. The processor is configured to receive a message, determine whether to perform a carrier frequency selection process based on the received message, the carrier frequency selection process being performed for determining a carrier frequency for the user equipment to operate on, and determine the carrier frequency by performing the carrier frequency selection process if the processor determines to perform the carrier frequency selection process.

In yet another example embodiment, the processor determines to perform the carrier frequency selection process if the message includes a first list and the user equipment detects a new cell identification for a cell currently serving the user equipment, the first list including a small cell carrier frequency selection probability value and a list of neighboring macro cell carrier frequency selection probability values, or the message includes the first list and a randomization bit indicates that the carrier frequency selection process is to be performed.

In yet another example embodiment, the processor is configured to perform the carrier frequency selection process by determining a target carrier frequency, determining a priority of the target carrier frequency, determining an availability of the target carrier frequency, and determining whether to change a current carrier frequency of the user equipment to the target carrier frequency based on the priority and the availability of the target carrier frequency.

In yet another example embodiment, the processor is configured to determine the target carrier frequency by generating a random number and matching the random number with one of a plurality of probability values, the plurality of probability values including a small cell carrier frequency selection probability value, at least one neighboring macro cell carrier frequency selection probability value and a probability of remaining on the current carrier frequency of the user equipment. The processor is further configured to determine the target carrier frequency by selecting a carrier frequency associated with the matched one of the plurality of probability values, to be the target carrier frequency.

In yet another example embodiment, the received message further includes a second list, the second list including carrier frequencies of small cells known to a serving macro cell from which the message is received. If the target carrier frequency is the carrier frequency associated with one of the at least one neighboring macro cell carrier frequency selection probability values, the processor is configured to assign a highest priority value to the target carrier frequency. If the target carrier frequency is the carrier frequency associated with the small cell carrier frequency selection probability value, the processor is configured to assign a highest priority value to all the carrier frequencies of the small cells.

In yet another example embodiment, when the processor is configured to assign a lowest priority value to a cell if the cell was previously associated with the user equipment, and determine whether the target carrier frequency is associated with the cell.

In yet another example embodiment, if the processor determines that the target carrier frequency is available and the target carrier frequency is associated with the cell, the processor is configured to determine the carrier frequency by determining whether a timer has expired, and determining, based on the expiration of the timer, whether to remain on the current carrier frequency of the user equipment or change the current carrier frequency of the user equipment to the target carrier frequency.

In yet another example embodiment, if the processor determines that the target carrier frequency is not available, the processor is configured to determine the carrier frequency by remaining on the current carrier frequency of the user equipment.

In one example embodiment, if the processor determines that the target frequency is available and the target carrier frequency is not associated with the cell, the processor is configured to determine the carrier frequency by changing the current carrier frequency of the user equipment to the target carrier frequency.

In yet another example embodiment, the processor determines to perform the carrier frequency selection process if the message includes a list of small cell carrier frequency selection probability values and one of the processor detects a new cell identification for a cell currently serving the user equipment, the user equipment detects at least one small cell, or the message includes a randomization bit indicating that the carrier frequency selection process is to be performed.

In yet another example embodiment, if the processor determines to perform the carrier frequency selection process, the processor is configured to perform the carrier frequency selection process by determining a target carrier frequency, determining a priority of the target carrier frequency, determining an availability of the target carrier frequency, and determining whether to change a current carrier frequency of the user equipment to the target carrier frequency based on the priority and the availability of the target carrier frequency.

In yet another example embodiment, the processor is configured to determine the target carrier frequency by generating a random number and matching the random number with one of plurality of probability values, the plurality of probability values including probability values of selecting neighboring macro cell carrier frequencies, probability values of selecting neighboring small cell carrier frequencies and a probability of remaining on the current carrier frequency of the user equipment. The processor is configured to determine the target carrier frequency by determining a carrier frequency associated with the matched one of the probability values, to be the target carrier frequency.

In yet another example embodiment, if the target carrier frequency is a carrier frequency of a small cell, the processor is configured to assign a highest priority value to the carrier frequency of the small cell and if the target carrier frequency is a carrier frequency of a macro cell, the processor is configured to assign a highest priority value to the carrier frequency of the macro cell.

In one example embodiment, a user equipment includes a processor configured to receive a message, the message including a list of at least one cell identification identifying a respective at least one cell, a carrier frequency associated with the at least one cell and a probability of selecting the carrier frequency associated with the at least one cell, and determine a carrier frequency, for the user equipment to operate on, based on the list and a status of the user equipment.

In yet another example embodiment, the at least one cell is an overloaded cell or a cell anticipated to be overloaded.

In yet another example embodiment, the processor is configured to determine whether the status of the user equipment indicates that the user equipment is in an idle mode, update a priority list of the user equipment based on the received message, the priority list including a plurality of target carrier frequencies, and select one of the plurality of target carrier frequencies with a highest priority value, if the processor determines that the status of the user equipment indicates that the user equipment is in an idle mode.

In yet another example embodiment, the processor is configured to update the priority list by assigning a lowest priority value to the carrier frequency of the at least one cell.

In yet another example embodiment, the processor is configured to determine the carrier frequency by determining an availability of the selected one of the plurality of target carrier frequencies, and changing a current carrier frequency of the use equipment to the target carrier frequency by based on the availability of the selected one of the plurality of target carrier frequencies.

In yet another example embodiment, if the processor determines that the selected one of the plurality of target carrier frequencies is not available, the processor is configured to change the current carrier frequency of the user equipment to another one of the plurality of target carrier frequencies having a next highest priority value.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments and wherein.

Figure 1:
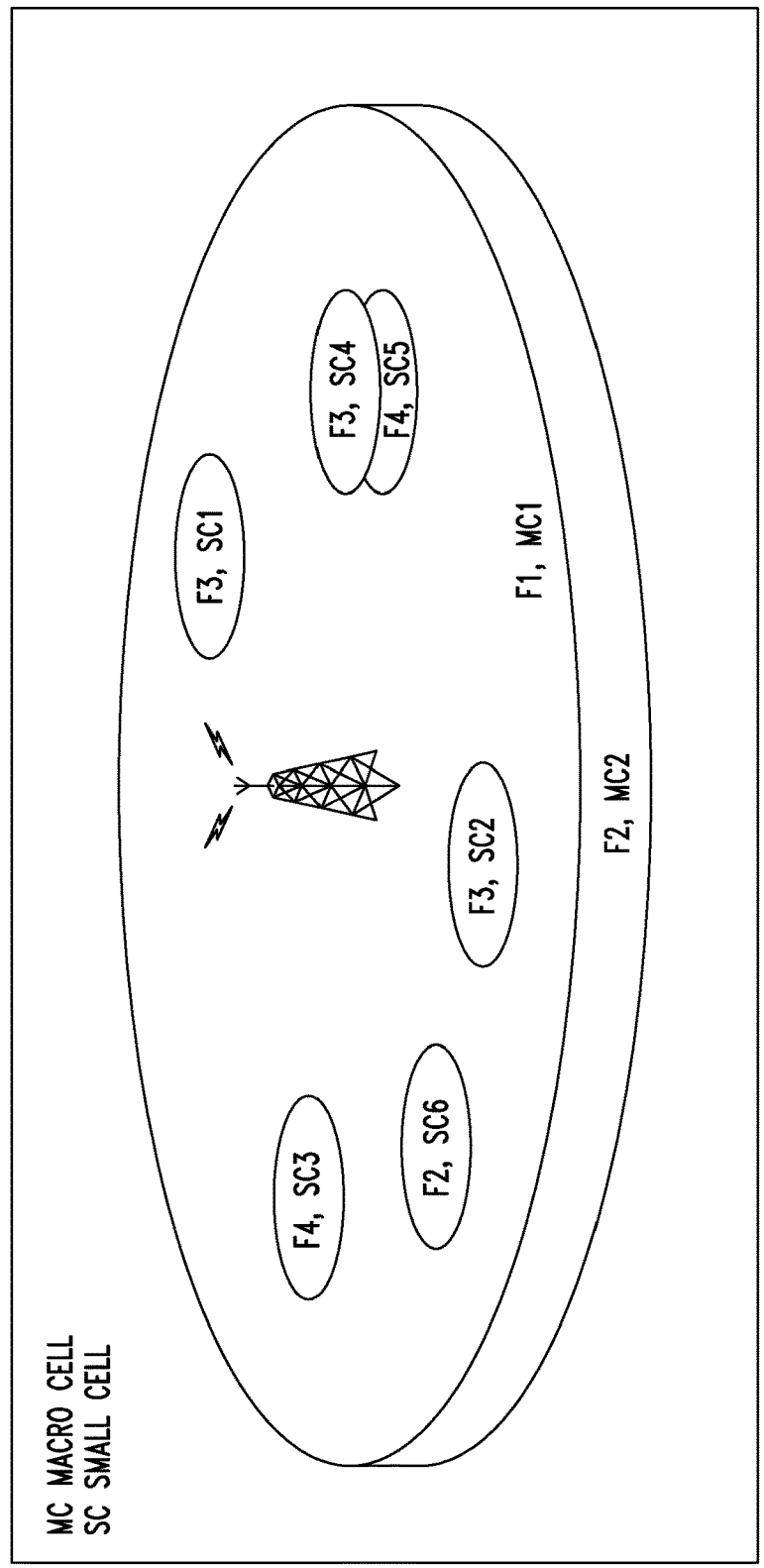
FIG. 1 illustrates an example configuration of a HetNet.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium, such as a non-transitory medium, or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 2:
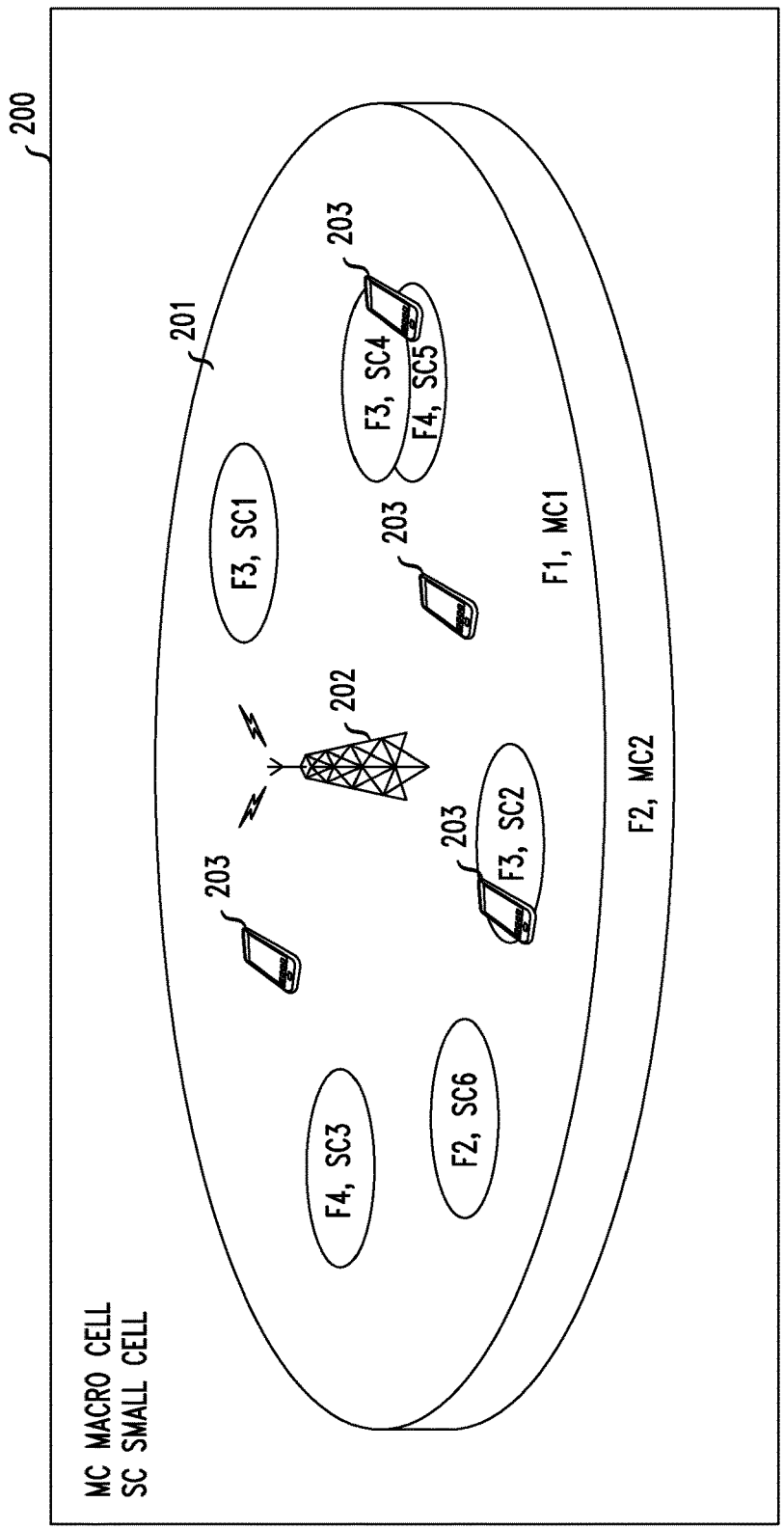
FIG. 2 illustrates a HetNet, according to an example embodiment.

FIG. 2 illustrates a HetNet, according to an example embodiment. HetNet 200 may include MC1, which designates a macro cell with a carrier frequency F1, serving a geographical area 201. MC2 designates another macro cell with a carrier frequency F2, which covers the same geographical area 201. In other embodiments, the geographical area covered by MC1 and MC2 may or may not be the same. Furthermore, F1 and F2 may or may not overlap.

MC1 includes base station 202 with which one or more UEs 203 may establish communication when the one or more UEs 203 are under coverage of the MC1. Furthermore, there may be one or more small cells (SC1-SC6), with carrier frequencies F2, F3 and F4, as shown. The geographical coverage of small cells SC1-SC6 may or may not overlap with each other. Carrier frequencies of SC1-SC6 may or may not overlap with that of other MCs and/or other SCs. UEs 203 may be in the coverage area of one or more SCs and/or MCs.

The HetNet 200 may be based on any one of, but not limited to, a Long Term Evolution (LTE) communication technology, a Global System for Mobile Communications communication technology (GSM), an Advanced LTE communication technology, General packet radio service communication technology (GPRS), Code division multiple access communication technology (CDMA), etc. The HetNet 200 may be based on more than one of the example communication technologies. For example, MC1 and MC2 of FIG. 2 may or may not be based on the same communication technology. Base station 202 may be a base station corresponding to the communication system of MC1 (e.g., eNode B, if MC1 is based on LTE communication technology; thus As used herein, the term "base station", may be considered synonymous to and/or referred to as an enhanced Node B (eNB), base transceiver station (BTS), NodeB, access point (AP), etc., or may describe equipment that provides the radio baseband functions for data and/or voice connectivity between a network and one or more users according to a respective communication technology). Small cells SC1-SC6 may be one or more of, but not limited to, a pico cell, a femto cell, a metro cell, etc. SC1-SC6 may be based on one or more of the above identified example communication technologies. SC1-SC6 may be based on one or more communication technologies that are different from that of MC1 and/or MC2. Furthermore, multiple carriers may be used by the macro and small cells.

Figure 3:
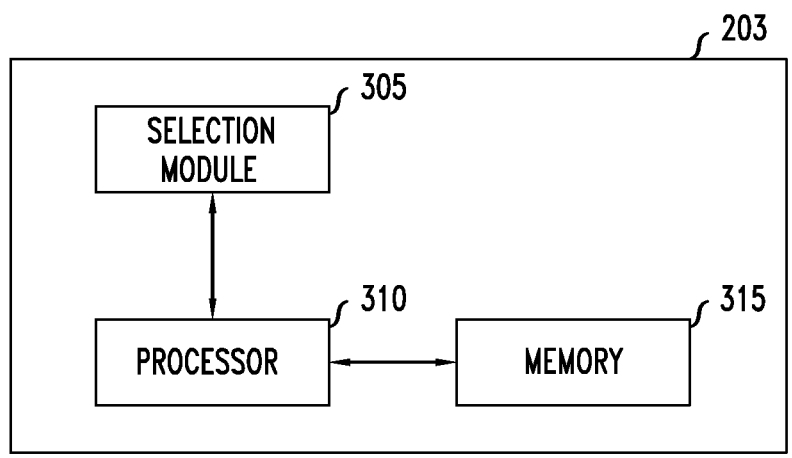
FIG. 3 illustrates a user equipment (UE), according to an example embodiment.

FIG. 3 illustrates a user equipment (UE), according to an example embodiment. As shown in FIG. 3, the UE 203 includes, at least, a selection module 305, a processor 310 and a memory 315. The processor 310 and the memory 315 operate together to run the functionality of UE 203. For example, the memory 315 may store code segments regarding UE functions (e.g., data transfer, control information signaling/handling and the like). The code segments may in-turn be executed by the processor 310. Further, the memory 315 may store one or more process variables and constants for use by the processor 310. Additional details regarding the processor 310 and the memory 315 are known to those skilled in the art and will not be discussed further for the sake of brevity.

The selection module 305 may be hardware including an additional processor (not shown). For example, the selection module 305 may be an application specific integrated circuit (ASIC) including self-contained hardware elements (e.g., a processor and a memory) configured to perform selection functions as, for example, software instructions. Alternatively, or in addition to, the selection module 305 may be a software module configured to co-operate with the processor 310 and the memory 315 in order to execute carrier selection functions, which will be described below.

Figure 4:
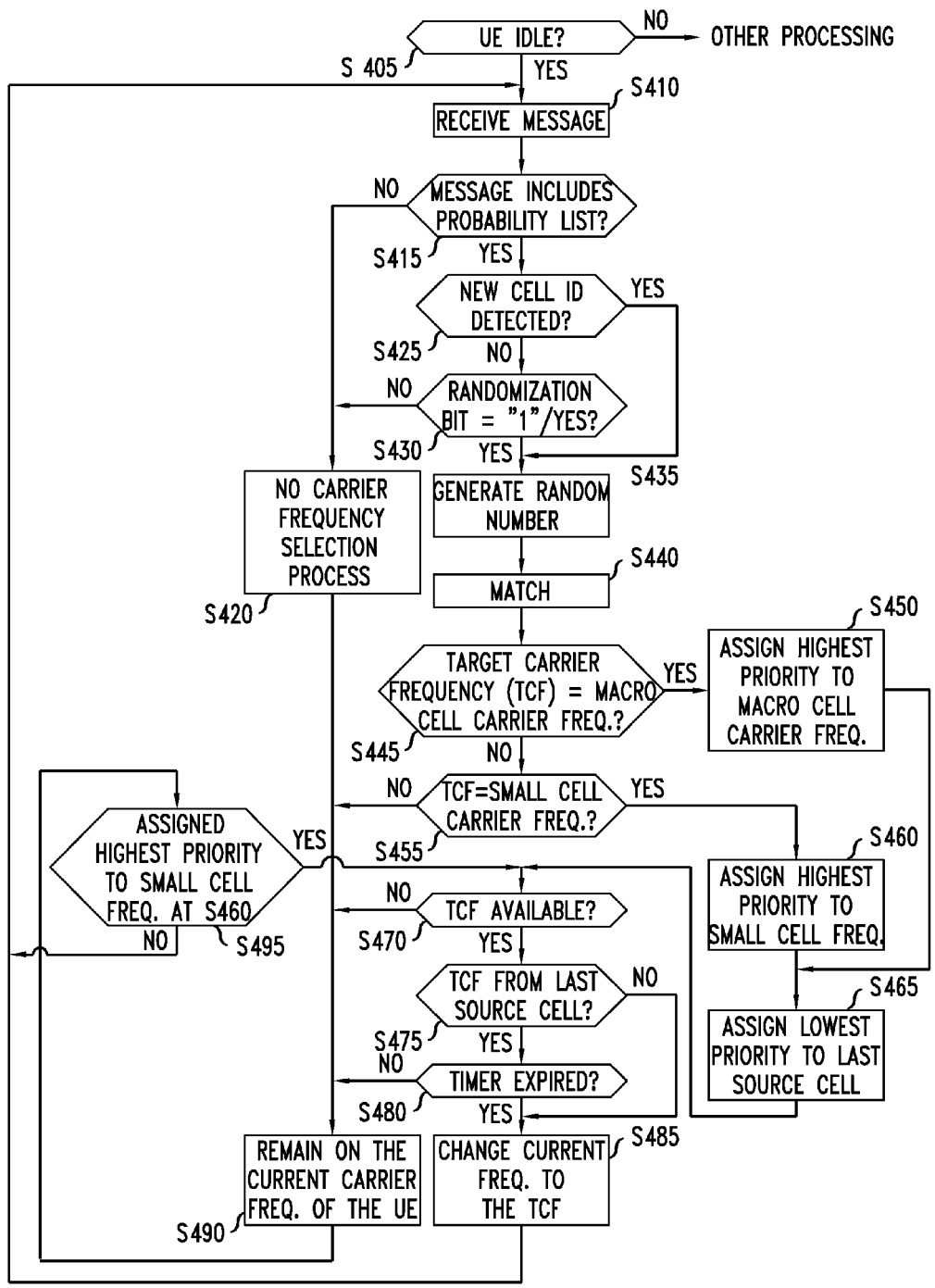
FIG. 4 illustrates a flow chart for a method for idle UE redistribution for load balancing in HetNets, according to an example embodiment.
Figure 5:
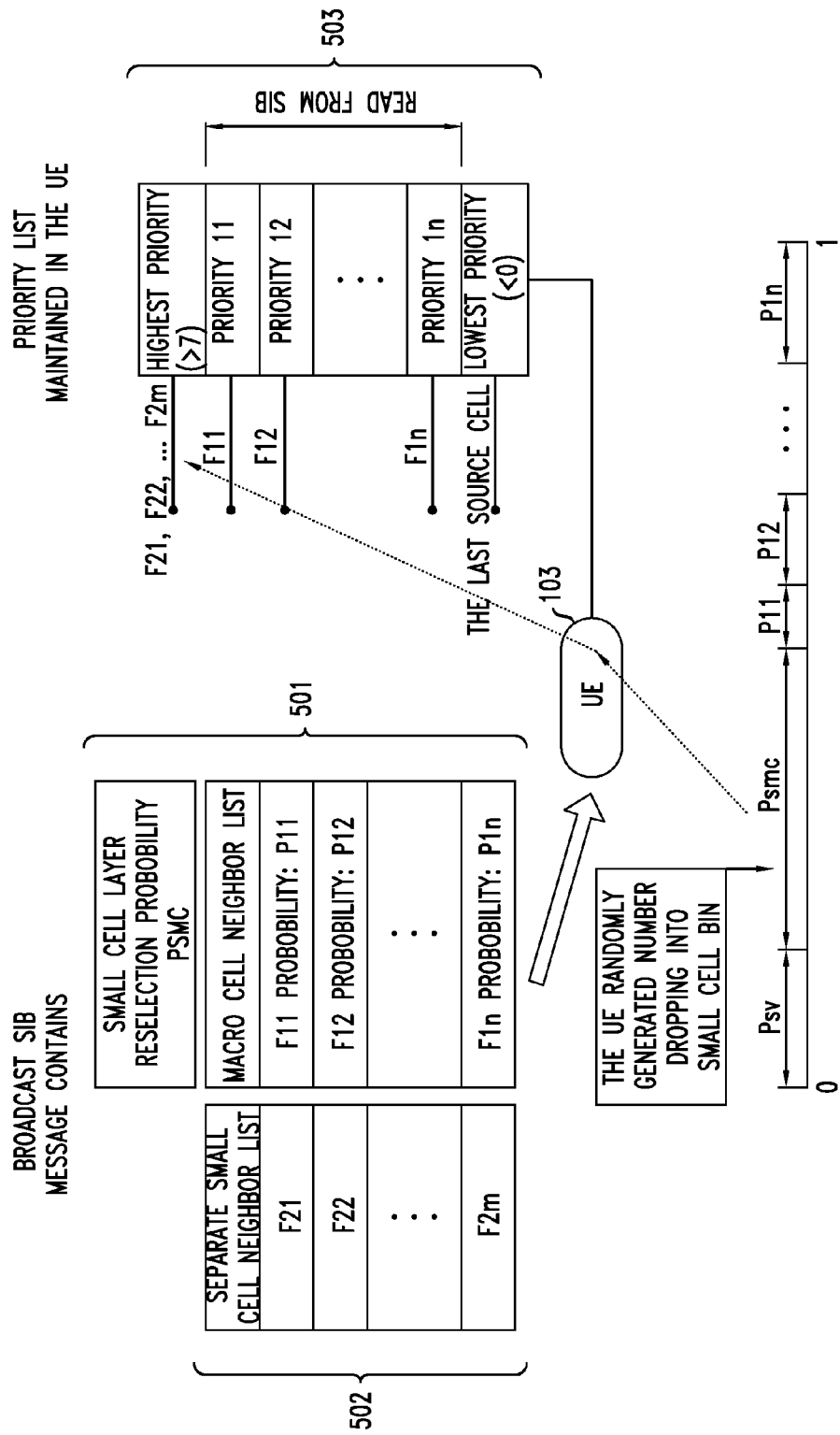
FIG. 5 illustrates a mechanism of the per carrier based method, according to an example embodiment.

FIG. 4 illustrates a flow chart for a method for idle UE redistribution for load balancing in HetNets, according to an example embodiment. The method described in FIG. 4 may be referred to as "per carrier based" method. FIG. 5 illustrates a mechanism of the per carrier based method, according to an example embodiment. Reference will be made to both FIG. 4 and FIG. 5, when describing the per carrier based method.

At S405, the processor 310 determines whether the UE 203 is in an idle mode. A UE being in an idle mode is known to those skilled in the art. For example, a UE (e.g., UE 105) is connected (e.g., RRC_CONNECTED state) when an RRC connection has been established. Otherwise, the UE is in an idle mode (e.g., RRC_IDLE state). If, at S405, the processor 310 determines that the UE 203 is not in an idle mode, then some other processing is carried out.

However, if at S405, the processor 310 determines that the UE 203 is in an idle mode, then at S410 the processor 310 of the UE 203 may receive a message from a network entity, where the network entity may be the base station 202 of the macro cell MC1, shown in FIG. 2. The received message may be a system information block (SIB) message including redistribution information for the UEs. The received message may also be referred to as a redistribution message and/or a selection message. The redistribution message may include two lists. The two lists may be list 501 and list 502, shown in FIG. 5. The first list 501 may include a probability of an idle UE selecting a carrier frequency of a small cell to transition to (Psmc). The list 501 may also be referred to as the probability list. The list 501 further includes neighboring carrier frequencies and the corresponding redistribution probabilities. For example, list 501 includes an entry "F11 Probability: P11". "F11 Probability: P11" means that an idle UE, which has received the message from the network entity, selects the neighboring macro cell carrier frequency F11 with probability P11, to transition to from the current carrier frequency to which the UE belongs. In one example embodiment, the neighboring macro cell frequencies may be that of the same macro cell from which the message is received or may be associated with other macro cells. The second list 502 is a small cell neighbor list and may include the frequencies of small cell neighbors.

After receiving the message, the processor 310 may determine whether to perform a probabilistic carrier frequency selection process for determining a carrier frequency for the idle UE 203 to operate on. The probabilistic carrier frequency selection process may also be referred to as the randomization test. The determination of whether to perform the carrier frequency selection process may be as follows.

At S415, the processor 310 may determine whether the received message includes the list 501. If not, the process moves to S420, where no probabilistic target carrier frequency determination is performed by the processor 310, and the process may proceed to S490, which will be described below. However if at S415, the processor 310 determines that the received message includes the list 501, then at S425, the processor 310 may determine whether the UE 203 has detected a new cell identification for a cell that is currently serving the UE 203. The UE 203 may detect a new cell ID based on any known or to be developed method. For example, the UE 203 may detect a new cell ID based on measurement of signals received at the UE 203 from other cells (e.g., small cells and/or macro cells).

If at S425, the processor 310 determines that the UE 203 has detected a new cell ID, the processor will proceed to S435, which will be described below. However, if at S425, the processor 310 does not detect a new cell ID, then at S430, the processor 310 determines whether the received message includes a randomization bit. In one example embodiment, the randomization bit may be a "0" or a "1" bit, "yes" or "no" and/or any other symbol that may be used to indicate whether the processor 310 is to implement the randomization test or not. For example, if the randomization bit is "1" or "yes" or a value change, then the processor 310 proceeds to S435 for initiating the randomization test. If at S430, the processor 310 determines that the randomization bit indicates that no randomization test is to be performed (e.g., the randomization bit is "0" or no value change or indicates "no"), then the process may proceed to S420, where not randomization test is performed.

The carrier frequency selection process may be implemented at S435-S465, as will be described below. At S435, the processor 310 may generate a random number (e.g., between 0 and 1). The random number may be uniformly distributed over the 0 to 1 range. The processor 310 may match the generated random number, with one of the determined/provided probabilities. In one example embodiment, the probabilities are expressed as fractions ranging from 0 to 1. In another example embodiment, the probabilities may be expressed as percentages ranging from 0 to 100%. Accordingly, the random number may range from 0 to 100. In general, the range of the random number may correspond to the range of the probabilities listed in list one of the received message.

At S440, the processor 310 may match the generated number with one of a probability of the idle UE 203 remaining on the current carrier frequency with which the idle UE 203 is associated, a probability of transitioning to a small cell ($P_{smc}$), included in the list 501 received at S410, and one of the probabilities of transitioning to neighboring carrier frequencies of the macro cell (e.g., $F_{11}$ to $F_{1n}$)), included in the list 501 received at S410. The matched probability may have a carrier frequency associated therewith, which may hereinafter be referred to as a target carrier frequency. For example, referring to FIG. 5, if the random number matches $P_{12}$, the target carrier frequency will be $F_{12}$.

In one example embodiment, the processor 310 may determine the probability of the idle UE 203 remaining on the current carrier as follows:

$$P_{sv}+P_{smc}+P_{11}+P_{12}+\ldots+P_{1n}=1 \qquad (1)$$

wherein $P_{sv}$ designates the probability of the idle UE 203 remaining on its current carrier frequency and $P_{smc}$, $P_{11}$, ... $P_{1n}$ are provided by the network entity in the list 501.

At S445, the processor 310 may determine whether the generated random number matches one of the probabilities associated with the neighboring macro cell frequencies included in the list 501. If at S445, the processor 310 determines that the generated number matches one of the probabilities associated with the neighboring macro cell frequencies (included in the list 501), then at S450, the processor 310 assigns a highest priority value, in the UE's priority list (e.g., list 503 shown in FIG. 5), to the carrier frequency associated with the one of the probabilities that matched the generated random number. Thereafter, the process may proceed to S465, as will be described below.

However, if at S445, the processor 310 determines that the generated random number does not match any of the probabilities associated with the neighboring macro cell frequencies included in the list 501, then at S455, the processor 310 determines whether the generated random number matches $P_{smc}$, included in the list 501. If the generated random number matches $P_{smc}$, the processor 310, at S460, assigns the highest priority to all the small cell frequencies provided in list 502 (e.g., $F_{21}$ to $F_{2m}$). In other words, when the idle UE is to transition from its current associated carrier frequency, if any one of the $F_{21}$ to $F_{2m}$ are available, the processor 310 transitions or perform an idle handover to one of $F_{21}$ to $F_{2m}$. The carrier frequency whose probability has matched the generated random number may be referred to as the target carrier frequency. If at S455, the processor 310 determines that the generated random number does not match $P_{smc}$, then the process proceeds to S490, which will be described below.

At S465, the processor 310 may assign the lowest priority value to a source cell ID of the cell with which the idle UE 203 was previously associated. For example, as shown in FIG. 2, SC1, SC2 and SC4 are associated with the carrier frequency F3. Assume that prior to the current cell (e.g., MC1), the idle UE 203 was previously associated with cell ID SC1. Now, if the target carrier frequency is now F3, then UE 203 may reselect any one of SC1, SC2 or SC4. However, reselecting SC1 again (e.g., last source cell ID), may result in the Ping-Pong problem described above. Therefore, SC2 and SC4 may be given higher priorities to be selected by the UE 203 compared to SC1.

The priority list 503 mentioned above, is now described. In one example embodiment, the idle UE 203 may have a priority list 503 (which may be saved on the memory 315 of the UE 203), as shown in FIG. 5. The priorities associated with selecting $F_{11}$ to $F_{1n}$, included in the priority list 503 of the UE 203, may be retrieved from the message received from the network entity. The message may be a System Information Block (SIB) message. The processor 310 determines which carrier frequency the idle UE 203 should transition to, based on the priority list 503. For example, assume that the generated random number matches $P_{smc}$. Therefore, because the target carrier frequency is now the frequencies of the small cells (e.g., $F_{21}$ to $F_{2m}$), the processor 310 first attempts to transition to one of the $F_{21}$ to $F_{2m}$. If one of the $F_{21}$ to $F_{2m}$ is available for transition (e.g., is not overloaded), the processor 310 transitions from the current carrier frequency of the UE 203 to the one of the $F_{21}$ to $F_{2m}$. If more than one of $F_{21}$ to $F_{2m}$ are available for transition, the processor 310 selects one of the available $F_{21}$ to $F_{2m}$, with equal probabilities. However, assume that $F_{21}$ to $F_{2m}$ are all overloaded, then based on the priority list 503, the processor 310 selects $F_{11}$ for transition, assuming the priorities are listed in a descending order from top to bottom (e.g., priority 11>priority 12>priority 13> . . . >priority 1n).

Referring back to FIG. 4, at S470, the processor 310 determines whether the target carrier frequency is available for the UE 203 to transition to from the UE's current carrier frequency (e.g., the UE is in target carrier frequency's coverage). If at S470, the processor 310 determines that the target carrier frequency is not detected, the process will proceed to S490, where the processor 310 determines that the idle UE 203 should remain with a current carrier frequency/current cell serving the UE 203.

However, if at S470, the processor 310 determines that the target carrier frequency is available, then at S475, the processor 310 determines whether the target carrier frequency corresponds to a carrier frequency of the last source cell, described above with respect to S465. If at S475, the processor determines that the target carrier frequency does not correspond to that of the last source cell associated with the idle UE 203, then the process proceeds to S485, where the processor 310 changes a carrier frequency of the idle UE 203 from its current carrier frequency to the target carrier frequency, e.g., idle handover of the UE 203 to the target carrier frequency.

If at S475, the processor 310 determines that the target carrier frequency corresponds to that of the last source cell associated with the UE 203, then at S480, the processor 310 determines whether a timer has expired. The timer may keep track of/monitor a time period since the UE 203 was handed over from the carrier frequency of its last source cell to the carrier frequency of the cell to which the UE 203 currently belongs. The timer may be a part of instructions stored on memory 315 and executed by the processor 310.

If the time period exceeds a threshold, the processor 310 determines that the timer has expired. The threshold may be a design parameter which is pre-configured into the UE 203 and selected based on empirical studies. If the timer has not expired, the processor may proceed to S490, as described above.

However, if the processor 310 determines that the timer has expired, the processor 310, at S485, may change a current carrier frequency of the idle UE 203 to the target carrier frequency.

If the processor determines to remain on the current carrier frequency of the UE 203, then at S495, the processor 310 determines whether at S460, a small cell carrier frequency has been assigned the highest priority value in the priority list 503. If yes, then the process reverts back to S470 and S470-S495 may be periodically repeated until the UE 203 detects a presence of a small cell carrier frequency. However, if at S495, the processor 310 determines that a small cell carrier frequency was not assigned highest priority value, the process may return to S405 and S405-S495 may be repeated.

For small cells offload, since a small cell is fully overlaid with macro cell carriers and may also be fully/partially overlaid with other small cell(s), the probability setting should be the same as in the macro only system, described in U.S. application Ser. No. 13/552,008, filed by the Applicant, the entire content of which is hereby incorporated by reference.

If more than one overlaid small cells are overloaded and need to offload to the macro cell, the small cells may perform offloading one by one. When a small cell is performing offload, the carrier frequency of the other overloaded small cell(s) should be removed from the small cell neighbor list at the target macro cell to prevent multi-cell loop ping-ponging.

Figure 6:
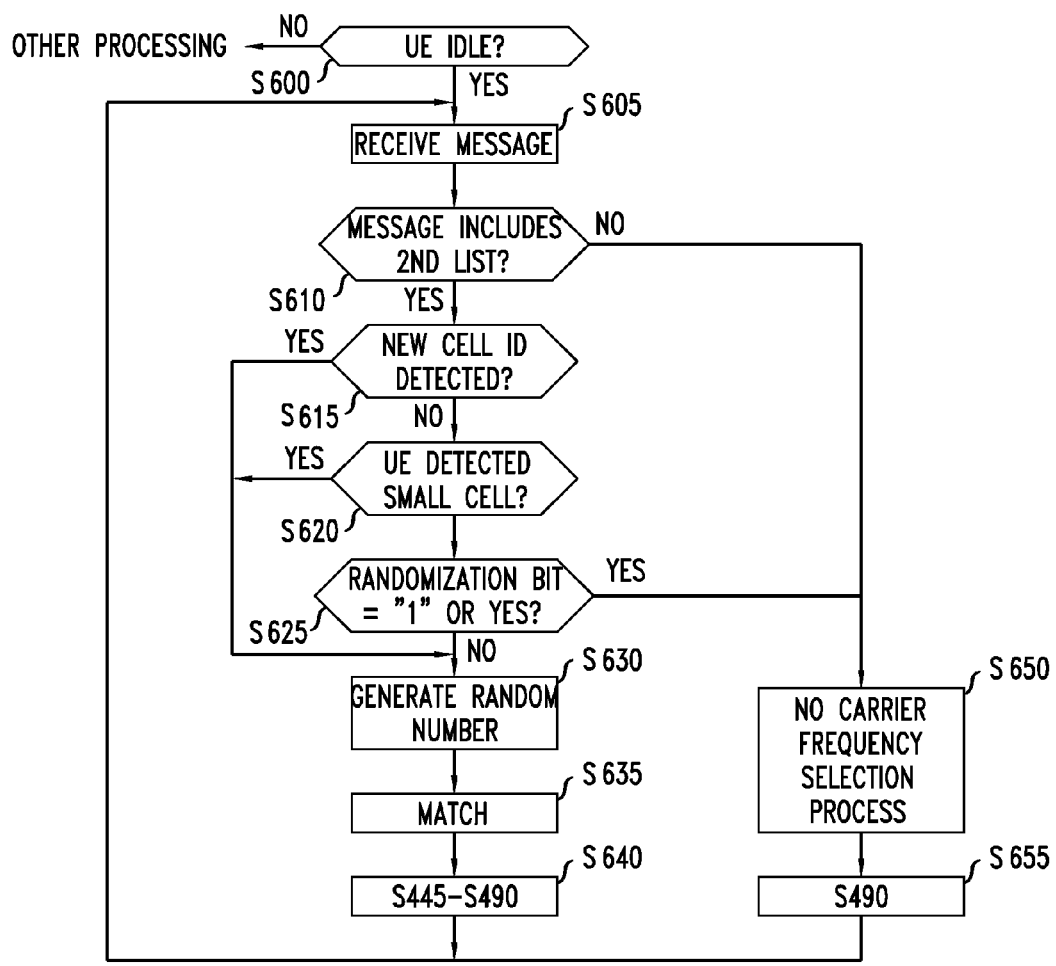
FIG. 6 illustrates a flow chart for a method for idle UE redistribution for load balancing in HetNets, according to an example embodiment.
Figure 7:
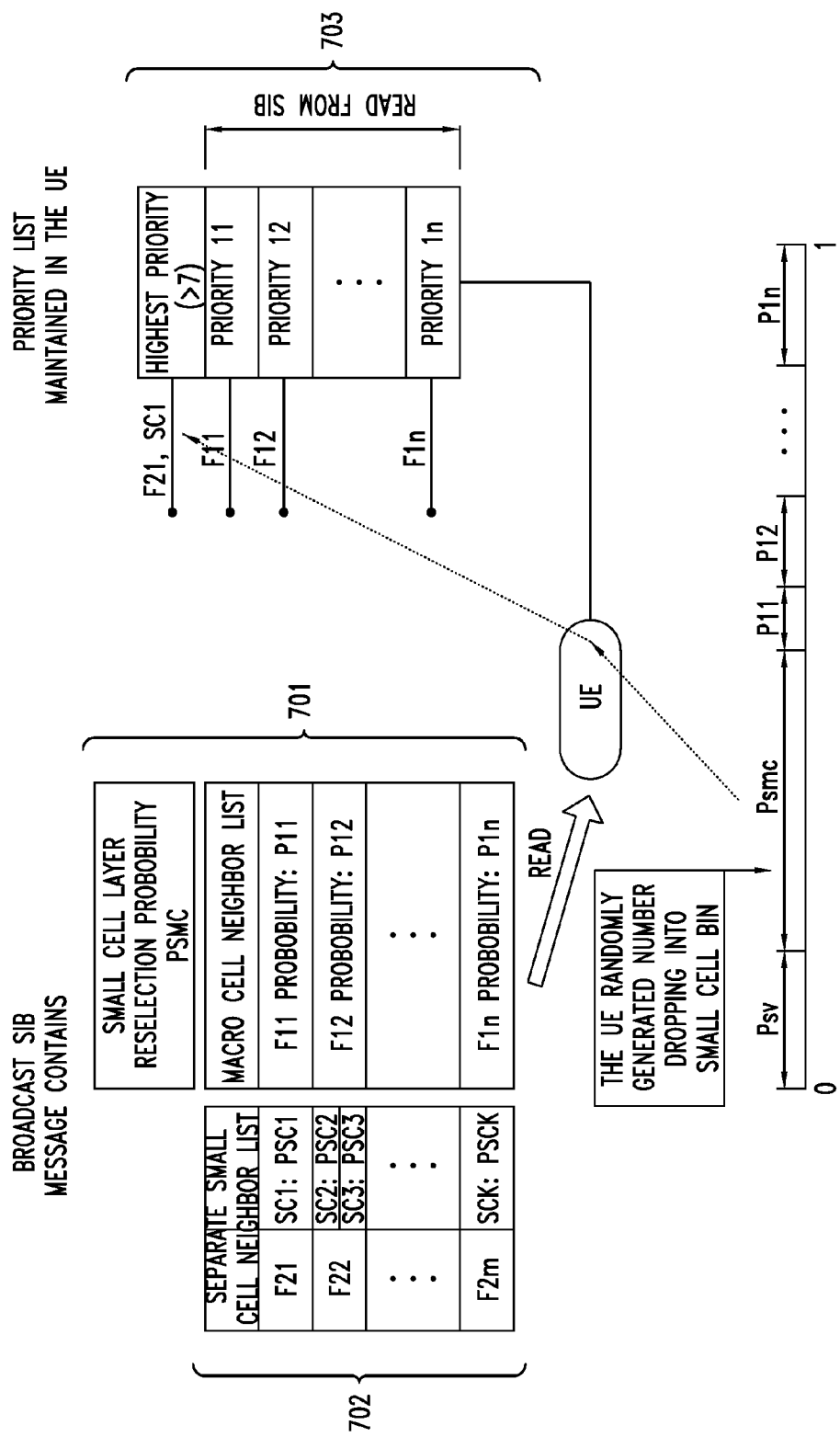
FIG. 7 illustrates a mechanism of the per carrier per cell based method, according to an example embodiment.

FIG. 6 illustrates a flow chart for a method for idle UE redistribution for load balancing in HetNets, according to an example embodiment. The method described in FIG. 6 may be referred to as "per carrier per cell based" method. FIG. 7 illustrates a mechanism of the per carrier per cell based method, according to an example embodiment. Reference will be made to both FIG. 6 and FIG. 7, when describing the per carrier per cell based method.

At S600, the processor 310 determines whether the UE 203 is in an idle mode. A UE being in an idle mode is known to those skilled in the art. For example, a UE (e.g., UE 105) is connected (e.g., RRC_CONNECTED state) when an RRC connection has been established. Otherwise, the UE is in an idle mode (e.g., RRC_IDLE state). If, at S600, the processor 310 determines that the UE 203 is not in an idle mode, then some other processing is carried out.

However, if at S600, the processor 310 determines that the UE 203 is in an idle mode, then at S605 the processor 310 of the UE 203 may receive a message from a network entity, where the network entity may be the base station 202 of the macro cell MC1, shown in FIG. 2. The received message may be a SIB message as described above. The received message may also be referred to as a redistribution message (may also be referred to as a selection message). The redistribution message may include two lists. The two lists may be list 701 and list 702, as shown in FIG. 7. The first list 701 may include neighboring carrier frequencies and the corresponding redistribution probabilities, the neighboring macro cell carrier frequencies neighboring a carrier frequency of the macro cell from which the message is received. For example, the list 701 includes an entry "F11 Probability: P11". "F11 Probability: P11" means that an idle UE, which has received the message from the network entity, selects the neighboring macro cell carrier frequency F11 with probability P11, to transition to from the current carrier frequency to which the UE belongs. In one example embodiment, the neighboring macro cell frequencies may be that of the same macro cell from which the message is received or may be associated with other macro cells. The received message may further include a randomization bit, which as will be described below, may be used in determining whether a target carrier frequency is to be determined.

The received message may further include a second list 702. The second list 702 may include a redistribution probability list (may also be referred to as a selection probability list), listing for each small cell, a corresponding cell ID, a corresponding carrier frequency and an associated probability. For example, the first entry of the list 702 indicates that small cell 1 (SC1) may be selected with probability $P_{sc1}$ and the carrier frequency associated with SC1 is $F_{21}$.

After receiving the message, the processor 310 may determine whether to perform a carrier frequency selection process for determine a carrier frequency for the idle UE 203 to operate on. The carrier frequency selection process may be a probabilistic carrier frequency selection process, as also discussed above. The determination of whether to perform the carrier frequency selection process for idle UE redistribution may be as follows.

At S610, the processor 310 determines whether the received message includes the first and second lists (the redistribution probabilities list). If the received message does not include the first and second lists, the process may proceed to S650, which is the same as S420, described above. Thereafter, the process may proceed to S655, which is the same as S490, described above. However, if the message includes the first and second lists, then at S615, the processor 310 determines whether the UE 203 has detected a new cell identification for a cell that is currently serving the UE 203. For example, after the UE 203 receives the overhead message, the processor 310 may compare the currently detected cell ID with the previously received and stored serving cell ID. If the processor 310 determines that the UE 203 is in the new serving cell with a new cell ID, the process proceeds to S630, which will be described below. The first and second lists may be stored in the memory 315 of the UE 203, as shown in FIG. 3.

If, at S615, the processor 310 determines that the cell ID of the UE 203's current serving cell has not changed, then at S620, the processor 310 may determine whether at least one small cell has been detected by the UE 203. The detection of the at least one small cell may be the same as described above, with respect to S425 of FIG. 4. If the processor 310 determines that at least one small cell has been detected, the process proceeds to S630, which will be described below.

If at S620, the processor 310 determines that the no small cell has been detected, at S625, the processor 310 determines whether the randomization bit included in the received message indicates that a target carrier frequency is to be determined. The randomization bit may also be referred to as a carrier frequency selection process bit. The randomization bit may be, for example, a 0 or a 1, with 1 indicating that the target carrier frequency is to be determined with randomization and 0 indicating that no target carrier frequency is to be determined with randomization, or the value change of the bit may indicate the target frequency needs to be determined by randomization. The randomization bit may include other symbols that may properly indicate whether a target carrier frequency is to be determined or not.

If the processor 310 determines that the randomization bit indicates that a carrier frequency selection process is to be performed, the process proceeds to S630, which will be described below. However, if the processor 310 determines that the randomization bit indicates that no carrier frequency selection process is to be performed, then the process proceeds to S650, as described above.

The carrier frequency selection process is now described with references to S630 to S-640. At S630 and in performing the probabilistic carrier frequency selection process, the processor 310 may generate a random number (e.g., between 0 and 1). The random number may be uniformly distributed over the 0 to 1 range. The processor 310 may match the generated random number, with one of the determined/provided probabilities. The range of the random number, as described above, may correspond to the range of the probabilities, included in the message.

At S635, the processor 310 may match the generated number with one of a probability of the idle UE 203 remaining on the current carrier frequency with which the idle UE 203 is associated, a probability of transitioning to a detected small cell ($P_{sc1}$, if SC1 has been detected or is a new macro cell ID) and probabilities of transitioning to neighboring carrier frequencies of the macro cell (e.g., $F_{11}$ to $F_{1n}$). The matched probability may have a carrier frequency associated therewith, which may hereinafter be referred to as a target carrier frequency. For example, referring to FIG. 7, if the random number matches $P_{12}$, the target carrier frequency will be $F_{12}$. In one example embodiment, there may be more than one new small cell ID or more than one detected small cells.

In one example embodiment, the processor 310 may determine the probability of the idle UE 203 remaining on the current carrier as follows:

$$P_{sv}+P_{sc1}+\ldots+P_{sck}+P_{11}+P_{12}+\ldots+P_{1n}=1 \quad (2)$$

wherein $P_{sv}$ designates the probability of the idle UE 203 remaining on its current carrier frequency, $P_{sc1}+\ldots+P_{sck}$ correspond to detected new overlapped small cell ID(s) and/or detected overlapped small cells, and $P_{11}, \ldots P_{1n}$ are provided by the network entity in the list 701.

Thereafter, at S640, the processor 310 may perform steps S445-S490, as described above with respect to FIG. 4.

For small cells offload, since a small cell is fully overlaid with macro cell carriers and other small cell(s) if applicable, the probability setting should be the same as in the macro only system, described in U.S. application Ser. No. 13/552, 008, filed by the Applicant, the entire content of which is hereby incorporated by reference.

When offloading at least one small cell to the macro layer, the probabilities corresponding to the offloading small cells which are broadcast at the target macro layer should be set to 0. This will prevent the UE offload to the macro layer from Ping-Ponging back to the previous source small cells.

Figure 8:
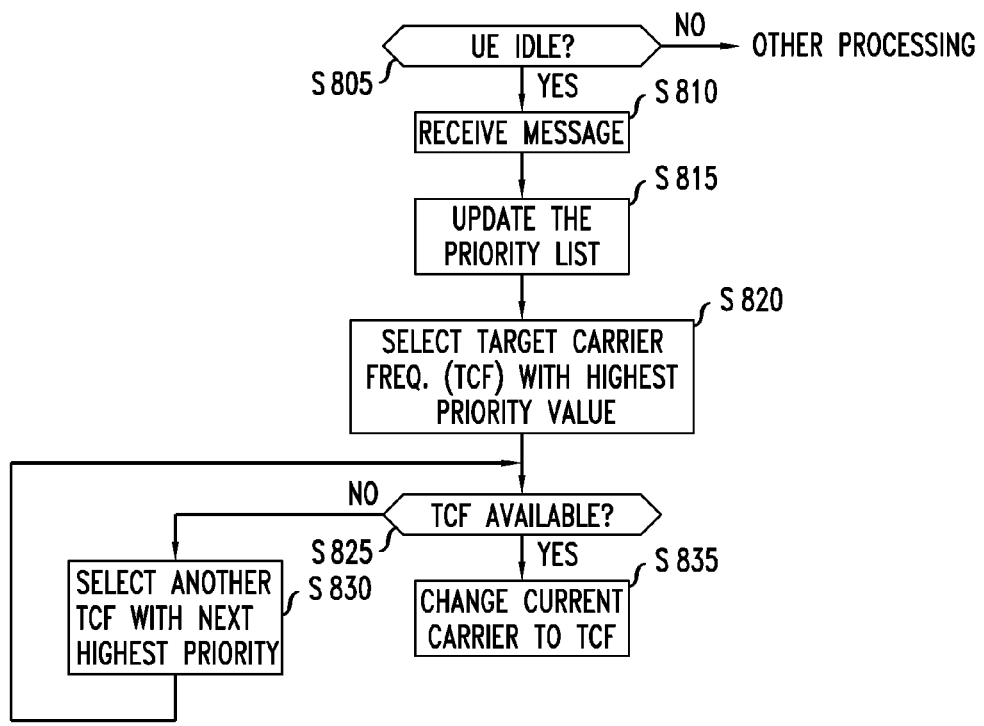
FIG. 8 illustrates a flow chart for a method for idle UE redistribution for load balancing in HetNets, according to an example embodiment.
Figure 9:
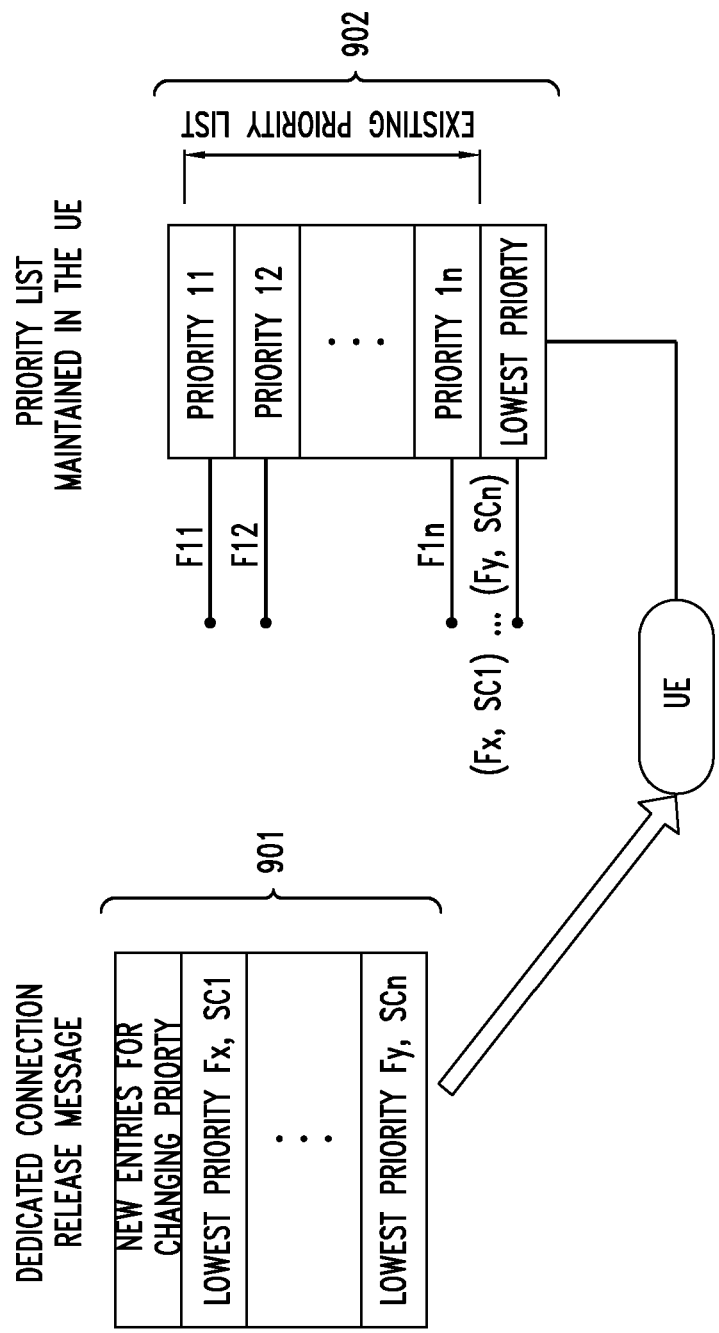
FIG. 9 illustrates a mechanism of the per cell based dedicated priority method, according to an example embodiment.

FIG. 8 illustrates a flow chart for a method for idle UE redistribution for load balancing in HetNets, according to an example embodiment. The method described in FIG. 8 may be referred to as "per cell per UE based dedicated priority" method. FIG. 9 illustrates a mechanism of the per cell per UE based dedicated priority method, according to an example embodiment. Reference will be made to both FIG. 8 and FIG. 9, when describing the per cell based dedicated priority method.

At S805, the processor 310 may determines whether the UE 203 has transitioned from an active state to an idle state. The determination of such transition from an active mode to an idle mode, may be via any method known in the art. If at S805, the processor 310 determines that the UE 203 is still in the active mode, the processor 310 may perform some other processing.

If at S805, the processor 310 determines that the UE 203 has transitioned to the idle state, at S810, the processor 310 of the UE 203 may receive a message from a network entity (e.g., at the time of transition from an active mode to the idle mode, the UE 203 may receive the message), where the network entity may be, for example, the base station 202 of the macro cell MC1, shown in FIG. 2. The received message may be a unicast message. In one example embodiment, the network entity may transmit the message whenever the network entity determines that one or more of available small cells are overloaded at the time when the UE transits from active to idle mode. The network transmitted and the UE received message may be a connection release message 901 in a LTE system. The message 901 may include entries of cell IDs (e.g., small cells and/or macro cells) that are overloaded and/or of concern (e.g., close to be being overloaded, anticipated by the base station to overload in the near future, etc.). The entries of the message may include, in addition to such cell IDs, carrier frequencies associated with such cell IDs.

At S815, the processor 310 of the UE 203 may update a priority list already existing on the UE 203, such as the priority list 902, which may include a plurality of target carrier frequencies that the processor 310 may decide to change to, from the current carrier frequency of the UE 203. In one example embodiment, the updated priority list may assign the lowest priority to the carrier frequency of the overloaded cells included in the message 901 received from the network entity. The priority list 902 of the UE 203 may be the same as that described above and may be stored on the memory 315 of the UE 203. In one example embodiment, if the message indicates that SC1 is overloaded, then the processor 310 assigns the lower priority level to $F_x$ of SC1, in the UE's priority list 902.

At S820, the processor 310 may select one of the plurality of target carrier frequencies with the highest priority value. For example, the processor 310 may determine the priority value of a target carrier frequency from the priority list 902 of the UE 203. Thereafter, at S825, the processor 310 may determine whether the selected target carrier frequency is available. For example the processor 310 may determine the availability of the selected target carrier frequency by detecting/measuring signals received from the selected target carrier frequency.

If at S825, the processor 310 determines that the target carrier frequency is available, then at S835, the processor 310 may change a current carrier frequency of the idle UE 203 to the target carrier frequency and the UE idle handover to the target carrier frequency.

However, if at S825, the processor 310 determines that the target carrier frequency is not available, then at S830, the processor 310 may select another target carrier frequency having a next highest priority on the priority list 902. Thereafter, the process may revert back to S825 and S825-S835 may be repeated.

In one example embodiment shown in FIG. 9, assuming that all small cells are overloaded, then based on the message received at S805, the processor 310 assigns the lowest priorities to carrier frequencies of the small cells (e.g., SC1 to SCn). Thereafter, at S825 and based on the priority list 902, the processor 310 may choose $F_{11}$ to switch to from the current carrier frequency of the UE 203, assuming that $P_{11}$ is greater than $P_{12}, P_{13}, \ldots, P_{1n}$. However, if the processor 310 determines that $F_{11}$ is not available, then the processor 310 may choose the next carrier frequency (e.g., $F_{12}$) having the next highest priority value, assuming $P_{12}$ is greater than $P_{13}, P_{14} \ldots P_{1n}$.

In one example embodiment, the UE 302 may be embedded with a timer. Upon a time period (e.g., from the time of initiating the timer when the UE idle handover out of the de-prioritized cell) exceeding a given threshold, any de-prioritized small cell that is assigned the lowest priority in the priority list 902, may be removed by the processor 310 from the priority list 902. The threshold may be a design parameter which is pre-configured to the UE and selected based on empirical studies.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A user equipment comprising:
a processor configured to,
receive a message,
determine whether to perform a carrier frequency selection process based on the received message, the carrier frequency selection process being performed for determining a carrier frequency for the user equipment to operate on, and
determine the carrier frequency by performing the carrier frequency selection process if the processor determines to perform the carrier frequency selection process, the processor configured to
perform the carrier frequency selection process based on matching a random number to a probability value from among one or more probability values included in the received message, the one or more probability values corresponding to any two or more carrier frequencies each of the one or more probability values representing a probability of a corresponding one of the two or more carrier frequencies being selected for the user equipment to operate on,
wherein the random number is within a first range that corresponds in a lower value and an upper value to a second range of the one or more probability values.

2. The user equipment of claim 1, wherein the processor determines to perform the carrier frequency selection process if,
the received message includes a first list and the user equipment detects a new cell identification for a cell currently serving the user equipment, the first list including the one or more probability values corresponding to at least one of a small cell carrier frequency selection probability value and a list of neighboring macro cell carrier frequency selection probability values corresponding to the one or more carrier frequencies, or
the received message includes the first list and a randomization bit indicates that the carrier frequency selection process is to be performed.

3. The user equipment of claim 1, wherein the processor is further configured to perform the carrier frequency selection process by,
determining a target carrier frequency,
determining a priority of the target carrier frequency,
determining an availability of the target carrier frequency, and
determining whether to change a current carrier frequency of the user equipment to the target carrier frequency based on the priority and the availability of the target carrier frequency.

4. The user equipment of claim 3, wherein the processor is further configured to determine the target carrier frequency by,
generating the random number, matching the random number to one of the one or more probability values, the one or more probability values including a small cell carrier frequency selection probability value, at least one neighboring macro cell carrier frequency selection probability value and a probability of remaining on the current carrier frequency of the user equipment, and selecting a carrier frequency associated with the matched one of the one or more probability values, to be the target carrier frequency.

5. The user equipment of claim 4, wherein the received message further includes a second list, the second list including carrier frequencies of small cells known to a serving macro cell from which the message is received, and the processor is further configured to assign a highest priority value to the target carrier frequency if the target carrier frequency is the carrier frequency associated with one of the at least one neighboring macro cell carrier frequency selection probability values, and assign a highest priority value to all the carrier frequencies of the small cells if the target carrier frequency is the carrier frequency associated with the small cell carrier frequency selection probability value.

6. The user equipment of claim 5, wherein the processor is further configured to select, with equal priority, any one of the carrier frequencies of the small cells to be the target carrier frequency when the processor assigns the highest priority value to all of the carrier frequencies of the small cells.

7. The user equipment of claim 4, wherein the processor is further configured to, assign a lowest priority value to a cell if the cell was previously associated with the user equipment, and determine whether the target carrier frequency is associated with the cell.

8. The user equipment of claim 7, wherein the processor is further configured to determine, if the processor determines that the target carrier frequency is available and the target carrier frequency is associated with the cell, the carrier frequency by, determining whether a timer has expired, and determining, based on the expiration of the timer, whether to remain on the current carrier frequency of the user equipment or change the current carrier frequency of the user equipment to the target carrier frequency.

9. The user equipment of claim 7, wherein the processor is further configured to determine, if the processor determines that the target carrier frequency is not available, the carrier frequency, by remaining on the current carrier frequency of the user equipment.

10. The user equipment of claim 7, wherein, the processor is further configured to determine, if the processor determines that the target frequency is available and the target carrier frequency is not associated with the cell the carrier frequency, by changing the current carrier frequency of the user equipment to the target carrier frequency.

11. The user equipment of claim 1, wherein the processor determines to perform the carrier frequency selection process if, the processor detects a new cell identification for a cell currently serving the user equipment, the user equipment detects at least one small cell, or the message includes a randomization bit indicating that the carrier frequency selection process is to be performed.

12. The user equipment of claim 11, wherein the processor is further configured to perform the carrier frequency selection process, if the processor determines to perform the carrier frequency selection process, by, determining a target carrier frequency, determining a priority of the target carrier frequency, determining an availability of the target carrier frequency, and determining whether to change a current carrier frequency of the user equipment to the target carrier frequency based on the priority and the availability of the target carrier frequency.

13. The user equipment of claim 12, wherein the processor is further configured to determine the target carrier frequency by, generating the random number, matching the random number to the one or more probability values corresponding to the one or more carrier frequencies, the one or more probability values including probability values of selecting neighboring macro cell carrier frequencies, probability values of selecting neighboring small cell carrier frequencies and a probability of remaining on the current carrier frequency of the user equipment, and determining a carrier frequency associated with the matched one of the one or more probability values, to be the target carrier frequency.

14. The user equipment of claim 13, wherein the processor is further configured to assign a highest priority value to the carrier frequency of the small cell if the target carrier frequency is a carrier frequency of a small cell, and assign a highest priority value to the carrier frequency of the macro cell if the target carrier frequency is a carrier frequency of a macro cell.

15. A user equipment comprising:

a processor configured to, receive a message, the message including a list identifying at least one cell, a carrier frequency associated with the at least one cell and a probability of selecting the carrier frequency associated with the at least one cell, and determine a carrier frequency, for the user equipment to operate on, based on the list and a status of the user equipment, the processing configured to determine the carrier frequency based on a random number, matching a probability value from among one or more probability values included in the received message, the one or more probability values corresponding to any two more carrier frequencies each of the one or more probability values representing a probability of a corresponding one of the two or more frequencies being selected for the user equipment to operate on, wherein the random number is within a first range that corresponds in a lower value and an upper value to a second range of the one or more probability values.

16. The user equipment of claim 15, wherein the at least one cell is an overloaded cell or a cell anticipated to be overloaded.

17. The user equipment of claim 15, wherein the processor is further configured to,
   determine whether the status of the user equipment indicates that the user equipment is in an idle mode,
   update a priority list of the user equipment based on the received message, the priority list including a plurality of target carrier frequencies, and
   select one of the plurality of target carrier frequencies with a highest priority value, if the processor determines that the status of the user equipment indicates that the user equipment is in an idle mode.

18. The user equipment of claim 17, wherein the processor is further configured to
   update the priority list by assigning a lowest priority value to the carrier frequency of the at least one cell.

19. The user equipment of claim 17, wherein the processor is further configured to
   determine the carrier frequency by,
      determining an availability of the selected one of the plurality of target carrier frequencies, and
      changing a current carrier frequency of the use equipment to the target carrier frequency by based on the availability of the selected one of the plurality of target carrier frequencies.

20. The user equipment of claim 19, wherein the processor is further configured to
   change the current carrier frequency of the user equipment to another one of the plurality of target carrier frequencies having a next highest priority value if the processor determines that the selected one of the plurality of target carrier frequencies is not available.

\* \* \* \* \*